Patented July 1, 1941

2,247,851

UNITED STATES PATENT OFFICE 2,247,851

PROCESS FOR PREPARING FOOD FROM OLE-AGINOUS, PROTEIN-BASE, ORGANIC MATERIAL

Henry Rosenthal, Yonkers, N. Y.

Application April 21, 1938, Serial No. 203,328

3 Claims. (Cl. 99—2)

My invention relates to a novel method of preparing protein foods by an extraction of organic material containing both fatty oil and protein, utilizing low boiling hydrocarbons such as butane and propane and similar materials as the extraction medium, with the production of fatty oil and the simultaneous production of a novel solvent free meal from which protein substance of high nitrogen content may be obtained by extracting the meal with water as a solvent.

My invention is a continuation-in-part of my copending application, Serial No. 738,403, filed August 4, 1934, for Method and products of extracting animal oils, in which is claimed novel method of extraction for the recovery of fatty oils; and my copending application Serial No. 738,399, also filed August 4, 1934, for "Oil treating process" in which is claimed novel form of extractor; and my co-pending application Serial No. 738,400, also filed August 4, 1934, for "Oil extraction" in which is claimed a novel oil extraction process.

In the above application, I describe my process in connection with the production of oily products such as lard and lard oil from pork cracklings, with the simultaneous production of defatted protein residue, but I do not limit my invention for use with pork cracklings as it may be equally well adapted to other similar products from other animals.

Lard is produced from pork in several ways, one of which is known as the process of dry rendering. In this process the pork scraps containing both meat and bone with portions of fat are delivered to a cylinder where they are subjected to a heating operation in which the fat is rendered liquid so that portions of it may be separated from the solid material by simple drainage. During this heating process, water contained in the charge is largely evaporated and the "cracklings" resulting from the operation are a product containing approximately 10% or less of moisture, and up to 40% of fat. Cracklings, as discharged from the heating operation, are delivered to a cage hydraulic press which squeezes out further amounts of oil as a primary product and leaves the cracklings with usually over 10% and under 20% of oil when they are discharged from the press. The solid material discharged from the press is then usually ground and sold as chicken feed.

My method uses as its raw material either the crude cracklings before pressing or the cracklings after pressing and I prefer to use the latter, as the extractor for the use of the cracklings in this condition and/or the method of handling the material during extraction is less complicated with the pressed materials than it is with the unpressed. However, I can modify the form of extractor and/or the extraction operations so that the unpressed cracklings may be used as the raw material.

In using pressed cracklings, I prepare them for extraction by reducing the scraps by comminution to a size and shape that is readily extractable. I then remove the oil content by solvent extraction using a low boiling hydrocarbon in the liquid phase, such as liquid propane or liquid butane, as the solvent medium. I prefer that the extraction be conducted at a temperature below 130 deg. F.

While I prefer to use the cracklings after they have been pressed as the material to be extracted, by modification of my process, I can use the unpressed cracklings as a raw material. However, special precautions must be taken when the unpressed cracklings are used and the process modified accordingly. Due to the high oil content, the unpressed cracklings, if comminuted, will form an oily mass through which it is extremely difficult to distribute the liquid solvent or from which it is difficult to remove the solution. Therefore, when the unpressed cracklings are used as a raw material, they should be first subjected to the preliminary extraction treatment in the form that they are discharged from the dry rendering process, prior to their comminution.

This extraction treatment comprises subjecting the unpressed cracklings to the solvent action of low boiling hydrocarbons in the liquid phase, such as liquid propane and liquid butane. This treatment is preferably at a temperature below 130 deg. F. Such treatment will remove approximately half of the original oil content of the unpressed cracklings. After this preliminary extraction the cracklings are then comminuted and extracted in the manner described above in connection with pressed cracklings.

After the extraction is completed, the meal is entirely freed from solvent, which can easily be accomplished when low boiling hydrocarbons which are normally gases under ordinary conditions of temperature and pressure, are used as solvent. The meal thus obtained will contain less than 2% of oily or fatty material if the extraction has been properly conducted. The meal will be light colored, being somewhat creamy in color with a slight pinkish cast. It will have a high nitrogen content which will be in the neighborhood of 12½%. It will therefore make an excellent chicken food with no further treatment than proper grinding. However, due to its light color it might not be accepted by the trade in this form, as the materials now being marketed for this purpose are dark in color. However, I have found that I can easily modify the color of the meal by a simple further treatment and, at the same time, prepare it so that it is suitable for other purposes or, in the treatment, I can separate it into components, one of which is a substantially ash and fat free, nitrogenous substance having a nitrogen content in excess of 14%.

Thus if I treat the meal with water at a temperature below the atmospheric boiling point, a slurry is obtained which if dried and ground has an appearance very similar to that of the chicken feed, which is usually produced from the pressed cracklings, but my product will have a higher protein content than would be the case had the chicken feed been produced from the same pressed cracklings without previously extracting the fatty contents. Thus cracklings containing a nitrogen content of 11% and which would produce a chicken feed of this same nitrogen content by the usual method will make a chicken feed having a content in excess of 12% by my treatment, this increase in nitrogen content being due to the removal of fat.

If the slurry is dried in molds, after drying, it will remain as a hard, cohesive solid of substantially the same shape as the mold in which the slurry is dried, if these molds are of proper shape, the resulting solid material will be an excellent food for dogs.

As an alternate modification, the slurry may be allowed to settle and the supernatent solution withdrawn and filtered. This solution is of a gelatinous character and the filtering step is best conducted at a controlled hydrogen iron concentration. The filtered solution thus obtained will be a substantially pure solution of nitrogenous organic compound and when properly dried will have a nitrogen content of approximately 15%, on an "as is" basis and of about 17% on a moisture free basis. The quality of this compound depends to an appreciable extent upon the heat treatment given the cracklings in the dry rendering process. If this has been carefully controlled, a type of gelatin will result from drying of the water solution.

The settlings from the slurry may be separately dried in the same manner as described in the preceding paragraphs and the dried material may either be ground and used as chicken feed or if dried in molds it may be used as dog food in the same manner as if the solution had not been separately withdrawn from the slurry.

The products so obtained from the settlings will be similar to the products obtained from the whole slurry but will have a lower nitrogen content and a higher ash content. The solution withdrawn from the settled slurry, after drying at a temperature of about 220 deg. F., will be similar to dried glue or gelatin and will have a weight between 15% and 25% of the meal from which it is produced.

If water is not added but the extracted cracklings are heated to a temperature in excess of 240 deg. F. they will be perceptibly darkened. This becomes more noticeable at about 250 deg. F., and at 300 deg. F. to 350 deg. F. heating for 15 minutes will toast them.

With such material as cracklings, I prefer to comminute them for the extraction by passing them through a roll train composed of a plurality of pairs of rolls, the first pair of rollers in the train having a serrated circumference on a cross section. The notches and teeth of one roll of a pair interlock with the notches and teeth of its mating roll which performs a crimping and crushing action on the material passing through the roll. The last pair of rolls is not equipped with teeth but has roughened surfaces, with the two rolls of a pair operating at different peripheral speeds. This latter pair clutches the crimped material and tears apart the cells while still leaving the material in the form of flakes.

In carrying on my process I prefer to use the extractor specified and claimed in my copending application entitled "Oil treating process," Serial 738,399, of which this application is a continuation in part, where the extraction is to be conducted in a continuous manner. Where the extraction is to be conducted in batches, I prefer to use the extractor specified and claimed in my copending application entitled "Oil extraction," Serial 738,400, of which this application is a continuation in part. Where the oil is recovered in fractional parts of different melting points, I prefer that the method used be that specified and claimed in my copending application entitled "Separation of oils," Serial 738,401, of which this application is a continuation. The above named applications were each filed August 4, 1934, coincidentally with application Serial No. 738,403 of which this application is a continuation in part as mentioned above. However, I do not limit this invention to the particular form disclosed in the above mentioned applications, nor do I limit it to any particular form of apparatus.

In my copending application, Serial 738,402, for "Method and products of cottonseed oil extraction" and filed August 4, 1934, coincidentally with my application Serial 738,403 for "Method and Product of extracting animal oils," I describe an extraction similar to the above, using low-boiling hydrocarbons in the liquid phase for the extraction of cottonseed oil from cottonseed, together with the removal of solvent from the meal at temperatures below 130 deg. F. in the absence of air, and with the production of a light colored cottonseed meal in which the proteins are neither converted by the action of heat nor are they oxidized by heating in the presence of air or oxygen.

The principal object of my invention is to procure from organic materials comprising fatty oils and proteins and having a low use value, other materials having a higher use value, and to do this in an efficient and inexpensive manner. Other objects of my invention are apparent from this specification.

The operation of my invention may best be described with reference to the following drawings which form a part of this specification. In these drawings Figure 1 is a diagrammatic embodiment of my invention using continuous extraction.

Figure 1:
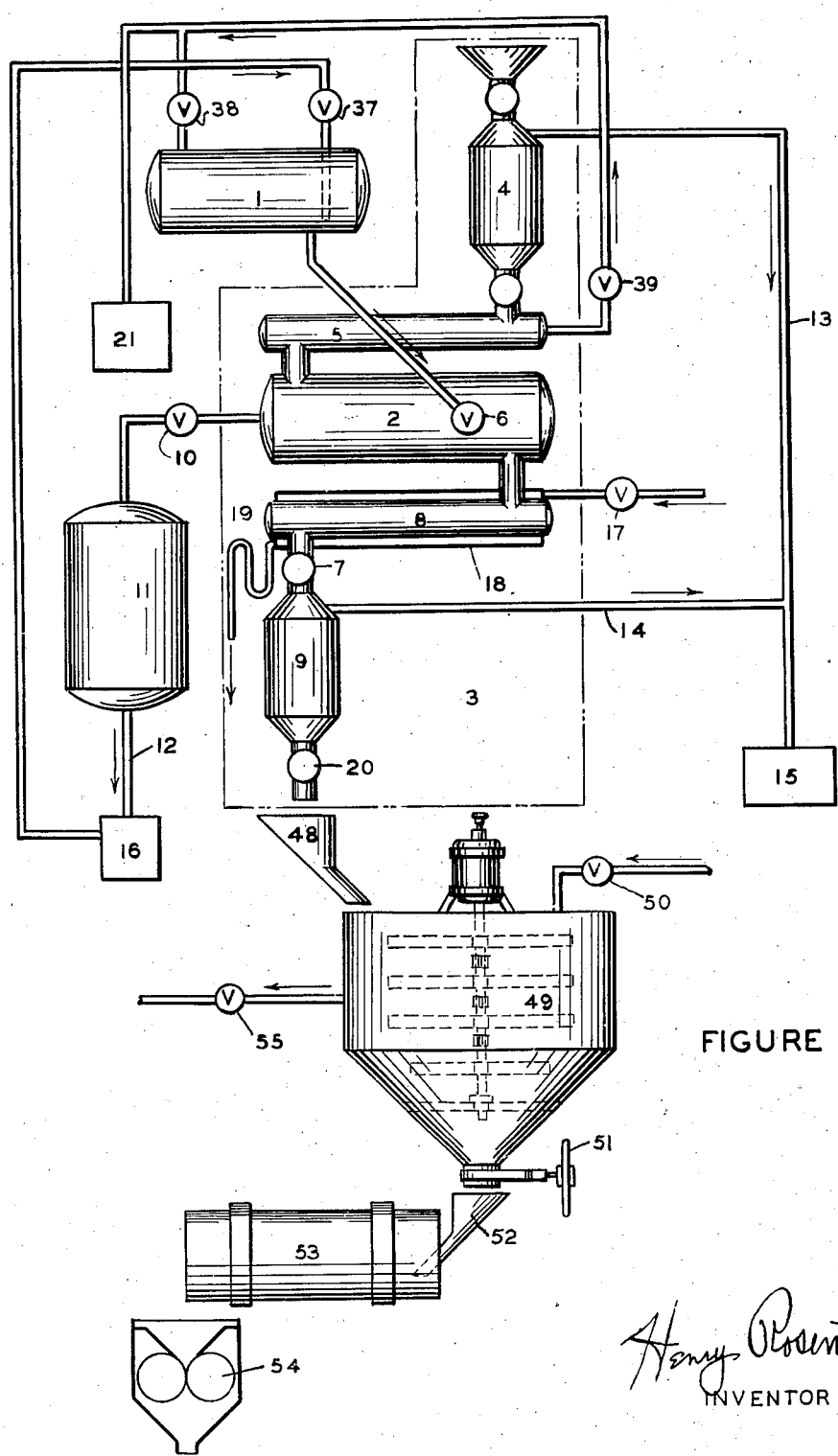

Referring to Figure 1, tank 1 is for the storage of solvent, which is held in storage at a suitable temperature. Solvent from the tank 1 enters the cylinder 2 of the extractor 3, through the control valve 6. The cracklings enter the extractor through the sealed inlet compartment 4 and the screw conveyor 5 from which they are delivered to the cylinder 2 where they pass in a counter-current direction to the solution. In this cylinder, the cracklings are contacted with the solvent, and after the oily fraction has been extracted, the solid material passes out of the cylinder 2 into the heated conveyor 8. Before discharging meal from the cylinder 2, it should be efficiently drained before its delivery to the heated conveyor 8 in which the solvent remaining in the meal is substantially completely vaporized before the meal is delivered to the sealed outlet compartment 9.

Solution in the cylinder 2 is withdrawn through the valve 10 to the equalizing tank 11 from which it passes through the pipe 12 into the oil recovery system illustrated in the figure by the block 16. Here the solvent is removed from the solution and the oil recovered in usable form, as more fully described in my copending applications. The solvent also is recovered after separation from the solution, and returned as a liquid to the solvent storage tank 1 through the valve 37.

The temperature in solvent tank 1 may be controlled at any predetermined value below that of the atmosphere by opening valve 38 and allowing solvent vapors to pass into the suction of the exhauster, illustrated by the rectangle 21.

Now returning to solid material from which the oil has been extracted and which is delivered from the cylinder 2 to the heated conveyor 8, this material is picked up by the conveyor which is encased in the steam jacket 18. Steam is admitted to the space between the jacket casing and the conveyor through the valve 17, and the condensate is removed through the trap 19. The valve 17 may be of the thermostatic type operated by the temperature of the meal discharged from the conveyor 8 into the valve 7 of the discharge lock 9. The valve 17 may be set to hold the temperature of the discharged meal somewhat above the temperature corresponding to the vapor pressure of the solvent at the pressure maintained within the extraction cylinder 2. This temperature under usual conditions will be about 130 deg. F., and will insure that all of the solvent associated with the meal delivered to the conveyor 8, will be evaporated when the meal is discharged from the conveyor. The meal is discharged from the extractor 3, through the discharge lock 9 with its valves 7 and 20.

This material is discharged to the hopper 48 from which it is delivered to the digester 49, of suitable form. Hot water is delivered to the digester through the valve 50 and the mixture of meal and water is thoroughly digested in any suitable manner. The whole slurry obtained in the digester 49 may be delivered through the valve 51 and the chute 52 to the dryer 53 wherein the moisture is removed. The dried material is then delivered to the crusher 54 where it is reduced in size. The product leaving the crusher, if properly prepared within the crusher, will be chicken feed produced from the cracklings. However, it will have a high protein content, and oil content of less than 2% if the extraction has been properly conducted. No trace of solvent will remain with the chicken feed thus prepared.

As an alternate method, the slurry produced in the digester 49 may be allowed to settle and the supernatant liquid withdrawn through the valve 55. This liquid may be filtered and dried in any suitable manner (not shown in the diagram) with a production of a substantially oil free and ash free nitrogenous organic substance. Except for such water as may remain in this product, after drying, the product will be composed almost entirely of organic nitrogen compounds. A sample of material produced in the manner described and having a moisture content of about 12½% showed nitrogen content of about 14½% indicating a protein content in excess of 92% on a dry basis, even if the proteins are figured at the low ratio of 5.55 to 1 which is the ratio commonly used for figuring gelatin from nitrogen content. The slurry remaining after withdrawing the solution through the valve 55 may be again treated with water in a similar manner and an additional amount of solution may be removed in the same manner. This process may be repeated as desired. After the materials have been thus treated in the digester 49 the remaining slurry may be discharged through the valve 51 and treated in the same manner as when no solution was withdrawn from the digester 49. In this case the material discharged from the crusher 54 will be similar to the chicken feed usually prepared from the pressed cracklings. The protein content of the materials so prepared may be more or less than the protein content of a feed prepared directly from the cracklings without the treatment given them in my process. Where solution is withdrawn from the digester 49 in the manner above described the protein content of the material delivered from the crusher 54 will be dependent upon the amount and strength of solution separately withdrawn from the digester.

Whether solution is withdrawn from the digester or the slurry is removed from the digester without first having removed the solution, the material withdrawn through valve 51 may be molded in proper shape and the dryer used may be of a form which will retain the materials in the mold during the drying process. In this case the materials leaving the dryer are not delivered to the crusher but may be disposed of in the molded form as a high protein content dog food.

Figure 2:
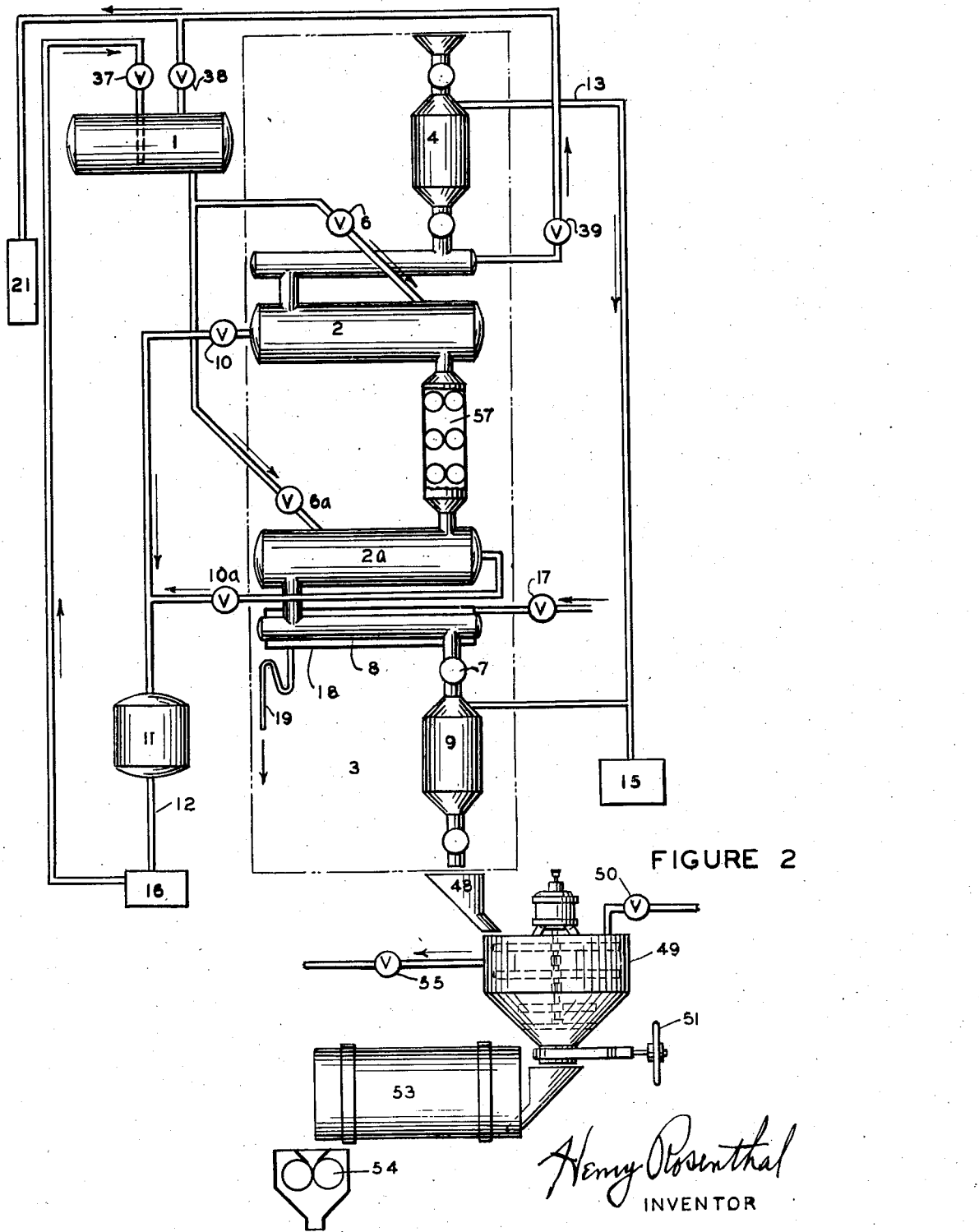
Figure 2 is a modification of Figure 1 adapted to use material similar to unpressed cracklings.

Now referring to Figure 2, which is a modification of Figure 1, whereby unpressed cracklings may be conveniently used in my process. In this figure unpressed cracklings as delivered from the dry rendering plant are delivered to the inlet compartment 4 of the extractor 3 from which they are passed through the cylinder 2 and treated in the same manner as hereinbefore described in connection with the unpressed cracklings. This treatment will effectively remove the superficial oil content of the cracklings which after the treatment will have a somewhat lower quantity of oil associated with them than do the cracklings after treatment in a cage press. They, therefore, may be crimped and rolled after this preliminary extraction without producing a mass that would be impervious within the extractor. After being removed from the cylinder 2 the cracklings are not drained as shown in Figure 1 but instead pass to the crimping and crushing rolls within the sealed compartment 57. There they are treated in the same manner as was described for the pressed cracklings and are delivered to the extractor cylinder 2a where they are treated by solvent from the tank 1 and are delivered to the heated conveyor 8. The solution from cylinder 2 and from cylinder 2a may be mixed and delivered to tank 11. The treatment of the cracklings after reaching cylinder 2a may be exactly the same as the treatment hereinbefore described for unpressed cracklings.

Figure 3:
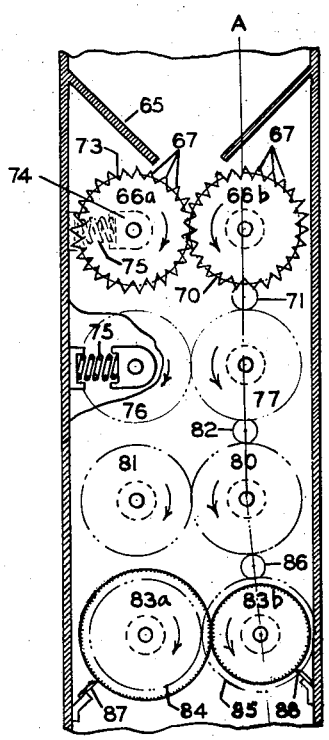
Figure 3 is an elevation of means for preparing meats so that they may be readily extracted.
Figure 4:
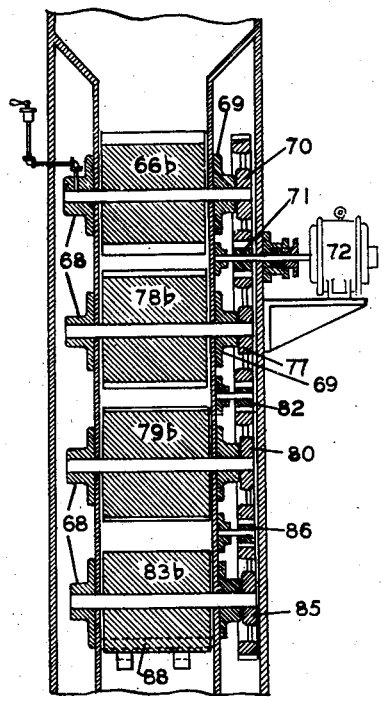
Figure 4 is a sectional elevation on the line 4—4 of Figure 3.

Now refer to Figures 3 and 4. These figures show preferred embodiment of means for comminuting the cracklings. As previously described, with pressed cracklings, the comminuting step should precede the charging of the cracklings to the extractor and in this case the roller device shown in Figures 3 and 4 would be placed to discharge into the inlet compartment 4. Where unpressed cracklings are used, the roller device shown in Figures 3 and 4 will be placed within the extractor at a point where the cracklings have been subjected to a preliminary extraction as hereinbefore described. The cracklings are delivered to the hopper 65 from which they are fed to a pair of rollers 66a and 66b. These rollers are serrated and provided with the interlocking teeth 67. These teeth should preferably be approximately ½ inch in height in order that they may easily handle the largest pieces of bone that may be associated with the cracklings. The roller 66b is mounted in the fixed bearings 68 and 69 which is driven by the gear 70 which in turn is driven by the pinion 71 connected with the motor 72. The gear 70 on the shaft of the roller 66b meshes with the gear 73 of similar size which drives the roller 66a. The roller 66a is mounted in a pair of bearings 74 (shown in Figure 3), which bearings are supported by the springs 75 which permit the movement of the roller 66a relative to the roller 66b. The roller 66a rotates clockwise and the roller 66b counterclockwise as shown in Figure 3 and in delivering the cracklings from the hopper 65 to a similar pair of rollers immediately below, exerts upon the larger pieces of material in the cracklings, a cutting and crimping action. Rollers 66a and 66b are so set relatively to each other that only the largest are acted upon in passing through the rollers, the smaller pieces passing through freely.

Immediately below rollers 66a and 66b are a similar set of rollers driven by the gears 76 and 77. These rollers 78a and 78b are of similar construction to the rollers 66a and 66b except that the teeth should be only about ¼ of an inch in height and the rollers should be set closer to each other than are rollers 66a and 66b. Roller 78b is driven by the gear 77 which receives its power from the motor pinion 71. Gear 77 also drives the gear 76, of the same diameter, which operates the roller 78a.

Immediately below the pair of rollers 78a and 78b is a similar pair of rollers 79a and 79b in which the teeth are preferably about ⅛ inch in height and where the rollers are set closer to each other than are either the pair 66a and 66b or the pair 78a and 78b. These rollers are driven by the gears 80 and 81, the gear 80 being driven by the gear 77 through the pinion 82. Rollers 79a and 79b prepare the cracklings for delivery to the crushing rollers 83a and 83b which are mounted similarly to the pairs of rollers above described and are driven in a similar manner by the gears 84 and 85 which are preferably of similar diameter. The gear 85 is driven through pinion 86 by the gear 80, and gear 84 is driven by meshing with the gear 85. The rollers 83a and 83b thus operate at the same rotational speed but as roller 83a is of larger diameter than 83b their peripheral speeds are different so that they set up a tearing action as well as a crushing action upon the cracklings passing through them. Both rollers 83a and 83b should preferably have a roughened surface such as the longitudinal milling about 1/64 inch deep. Without this milling on at least one of these crushing rolls, the crimped cracklings will not be fed through the rollers if they are set together close enough to exert proper crushing action. The scrapers 87 and 88, with their edge set in close proximity to either roll, scrape from the rolls any material that may adhere thereto. Little of the material will tend to adhere to the smaller roll 83b, but a considerable amount will tend to adhere to the larger roll 83a. The scraper 88 may therefore be omitted, but the scraper 87 is essential for proper operation.

Figure 5:
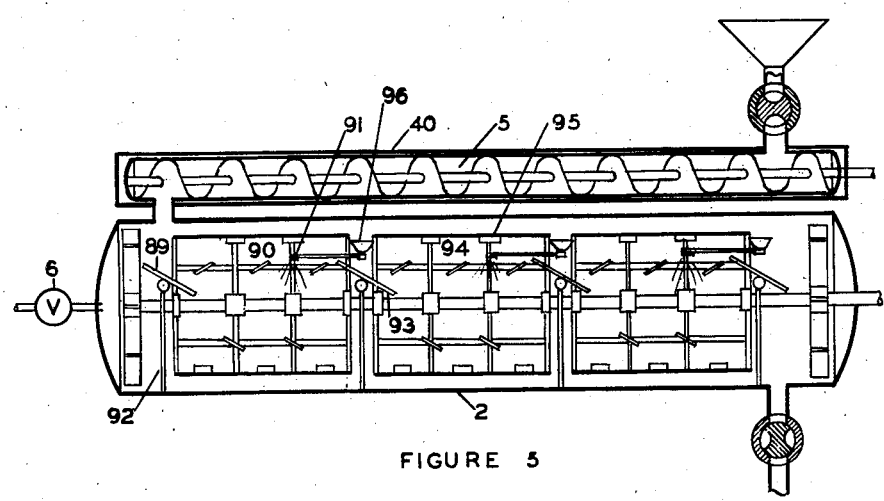
Figure 5 is an enlarged portion of the continuous extractor illustrated in Figures 1 and 2.

Figure 5 is an enlargement of the portion of the extractor shown in Figures 1 and 2. Solid material entering through the jacketed conveyor 5 is discharged upon the vane 89 which delivers it to the rotating cylinder 90 where it comes in contact with a solution delivered to the cylinder by the spray head 91. The solution passes through the freshly charged cracklings, and gains in concentration in this passage and is withdrawn through the bottom of the cylinder 90 and discharged into the compartment 92 from which it is withdrawn through the valve 6. The cracklings move forward in the rotating cylinder 90 and are discharged to the vane 93 which delivers them to the rotating cylinder 94. Here they meet a less concentrated solution admitted through the spray head 95 and are further extracted. The solution is withdrawn from the bottom of the cylinder 94 and is delivered to the trough 96 and the spray head 91. In this way the solution and the cracklings pass through the extractor countercurrently to each other. As many rotating cylinders may be used in series as is necessary to substantially effect complete extraction. A single cylindrical shell such as the shell 2 with its heads and interior compartments may be used as an extractor and a single solution obtained, or a plurality of shells may be placed in series with each other and a plurality of solutions obtained as illustrated in Figure 2.

Many changes may be made in the details of my invention without departing from the spirit of my invention, and I do not limit myself to the particular form shown.

Having described my invention so that it may be readily understood by one skilled in the art, I claim:

1. A process for preparing a food from oleaginous, partially dehydrated, comminuted animal scraps which comprises; removing therefrom substantially all of their oil content by means of a hydrocarbon solvent gaseous at ordinary temperature and pressure; then removing substantially all of the solvent retained with the extracted scraps; then treating the solvent-free, extracted, scraps with water to dissolve a substantial portion of said scraps; then drying the water-treated material, retaining at least a portion of the water protein solution whereby there is produced a product in which the water soluble material acts as a binder in the resultant product.

2. The method of preparing a food from oleaginous, protein-base, organic material which comprises; removing therefrom substantially all of the oil content by means of a hyrocarbon solvent, gaseous at ordinary temperature and pressure; then removing substantially all the solvent retained with the protein-base material; then treating the substantially oil-free and solvent-free, extracted, protein-base material with water to dissolve a substantial portion of the protein;

then drying the water-treated material retaining at least a portion of the water protein solution, whereby there is produced a product in which the water soluble material acts as a binder in the resultant product.

3. A process for preparing a food from cracklinks which comprises; removing therefrom substantially all of their oil content by means of a hydrocarbon solvent, gaseous at ordinary temperature and pressure; then removing substantially all of the solvent retained with the extracted cracklings; then treating the oil-free and solvent-free, extracted cracklings with water to dissolve a substantial portion of said cracklings; then drying the water-treated material, retaining at least a portion of the water protein solution, whereby there is produced a product in which the water soluble material acts as a binder in the resultant product.

HENRY ROSENTHAL.